Sept. 29, 1964 V. R. KAUFMAN 3,150,736
KNOCKDOWN GOLF BAG CART
Filed Dec. 3, 1962 2 Sheets-Sheet 1
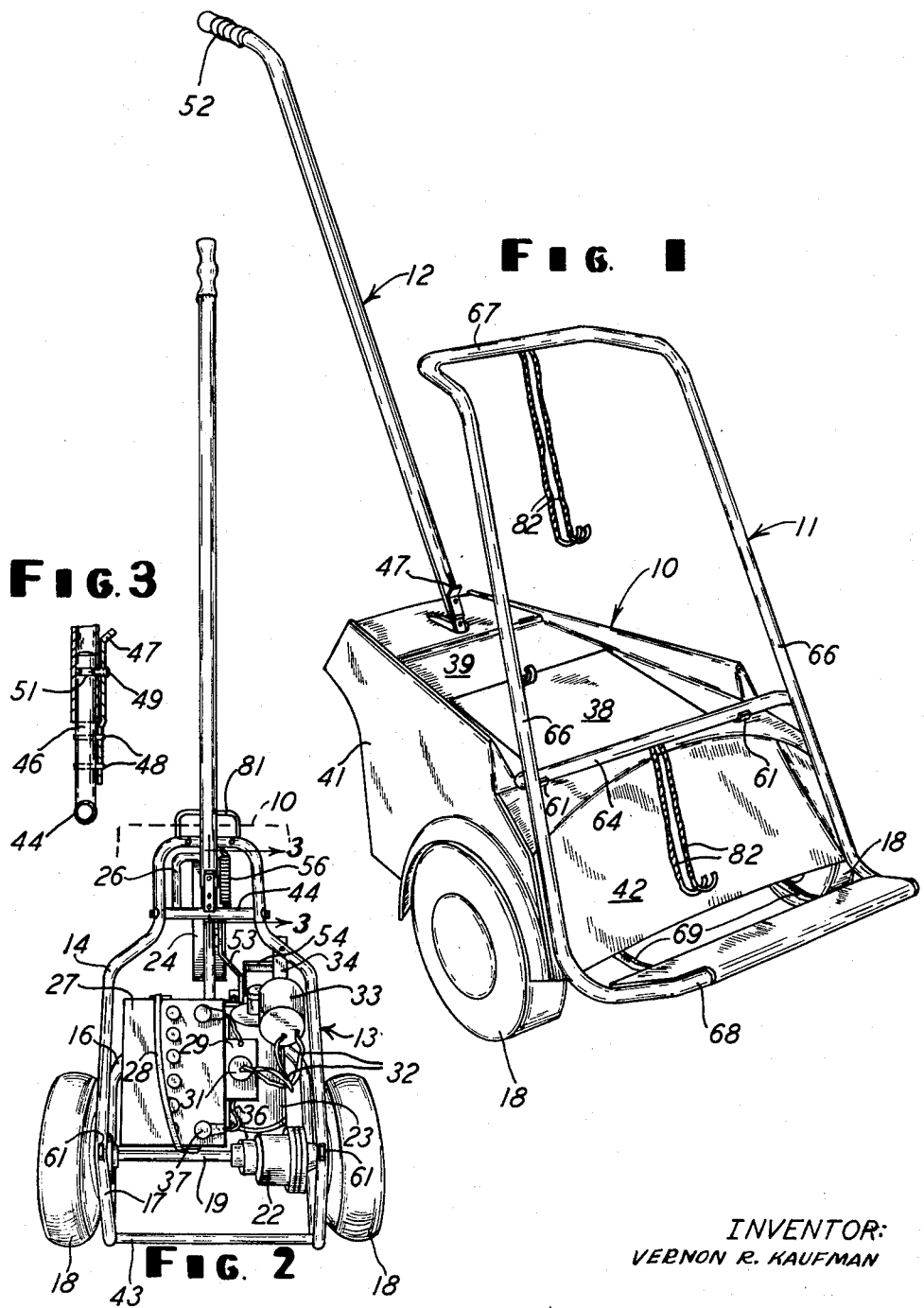
INVENTOR:
VERNON R. KAUFMAN
BY: Arthur J. Hansmann
ATTORNEY Sept. 29, 1964  V. R. KAUFMAN  3,150,736
KNOCKDOWN GOLF BAG CART
Filed Dec. 3, 1962  2 Sheets-Sheet 2
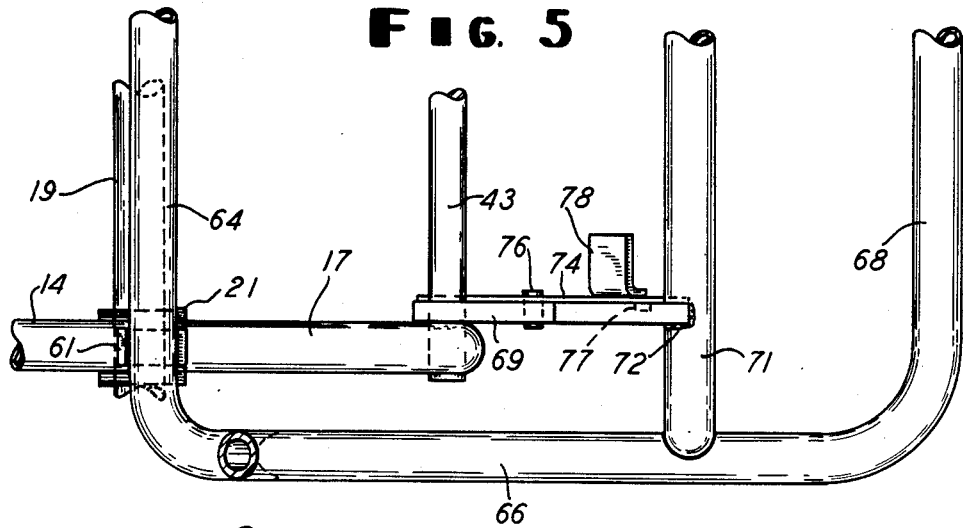
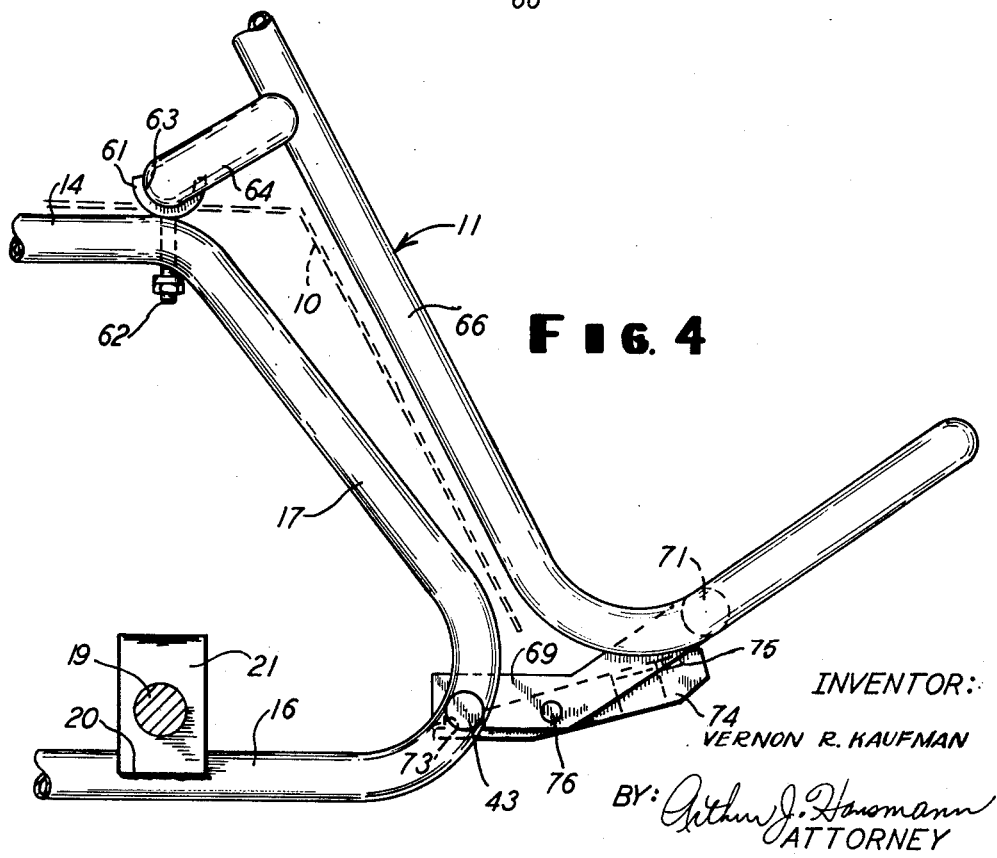
INVENTOR:
VERNON R. KAUFMAN
BY: Arthur J. Hausmann
ATTORNEY

United States Patent Office 3,150,736
Patented Sept. 29, 1964

3,150,736
KNOCKDOWN GOLF BAG CART
Vernon R. Kaufman, 821 Kingston Ave., Racine, Wis.
Filed Dec. 3, 1962, Ser. No. 241,603
2 Claims. (Cl. 180—19)

This invention relates to a powered golf cart.

Golf carts of both the type which is known and used for conveying golf bags present the problem of storage for transporting them to and from the golf course, and also for general storage when not in use. The powered and manual type of golf bag carts which are now used have both the features of being collapsible and of being disassembled for the storage purposes. However, in modern golf bag cart designs, there is the requirement for providing a powered cart for transporting the golf bags, with the cart so designed that the driving means of the battery, motor, relay, and the like are completely covered and enclosed for both protection of the elements and protection of the users, and the modern design then also requires that the bag rack and the handle be suitable for their functional purposes when in use, but they must also be placed out of the way when the cart is to be stored for transporting or the like, as mentioned.

Accordingly, it is a general object of this invention to provide a powered golf bag cart wherein the cart is provided with all of the essential features for supporting and transporting golf bags, and at the same time, the cart can be easily manipulated for both reducing its size to a small volume in overall extent and for being picked up and placed into the trunk of the car, or in like handling.

A more specific object of this invention is to provide a powered golf bag cart wherein the cart can be readily and easily disassembled into several pieces which are both light and adaptable for storage.

Still a further object of this invention is to provide a golf bag cart of the powered type wherein the elements providing the power and the drive of the cart are enclosed by a body member and wherein a control handle and a golf bag rack are connected to the frame of the cart for extending above the body member, but with the handle and the rack being readily detachable from the frame for providing a compact disassembled cart.

Other objects and advantages will become apparent upon reading the following description in light of the accompanying drawings, wherein:

FIG. 1 is a rear perspective view of a golf cart embodying a preferred arrangement of my invention.

FIG. 2 is a top photograph perspective view of the embodyment shown in FIG. 1, but with the bag rack and body removed therefrom.

FIG. 3 is an enlarged sectional view taken along the line 3—3 of FIG. 2.

FIG. 4 is an enlarged side elevational view of the rear portion of the frame and the lower portion of the bag rack.

FIG. 5 is a top plan view of that shown in FIG. 4.

The same reference numerals refer to the same parts throughout the several views.

The invention is embodied in a three-wheeled type of powered golf bag cart which includes a body portion 10, a bag rack portion 11 and a handle portion 12. The base unit of the cart includes the frame 13 shown in FIG. 2 and the frame is disposed in a continuous piece of tubing extending through the upper portion 14 and a lower portion 16 with a rear inclined portion 17 extending between the top and bottom portions 14 and 16. Two rear wheels 18 are mounted on the rear axle 19, which is of course in turn mounted on the frame lower portion 16 in any suitable manner. In this connection, FIG. 4 shows a bracket 21 welded at 20 to the lower frame portion 16, and axle 19 is shown to extend through the bracket 21. Of course suitable bearings can be employed between the bracket 21 and the axle 19, and FIG. 2 shows a differential 22 mounted on the axle 19 to connect between the axle and the electric motor 23 which of course powers the cart and it particularly of course rotates the axle 19 and the driving wheels 18.

A front wheel 24 is disposed below the frame upper portion 14 and a swivel arm 26 extends from the upper portion down to the wheel 24 in any suitable manner of connecting between the frame 14 and the wheel 24, so that the front of the frame will of course be supported by the wheel in the conventional and well-known manner. Thus, any conventional and well-known manner of mobily supporting the frame 13 by means of the three wheels described can be employed and is utilized in this construction.

Continuing the description of the power plant or means, an electric battery 27 is supported on the frame lower portion 16 and it has a strap 28 extending over the top of the battery. Also a terminal plate 29 is attached to the battery and a plug 31 connects to the terminal plate 29, and it will be noted that the plug has wires 32 extending therefrom to an electric rheostat 33, which is also mounted on the frame 13 by means of the brace 34, and this mounting can be in any conventional or well-known manner. The connecting plate 29 on the battery 27 has wires 36 extending to the battery posts, such as the one post indicated 37, to provide the connection between the battery 27 and the plate 29. It will therefore be understood that the plug 31 can be removed from the battery plate 29, and thus the battery 27 can be lifted from the frame 13 so that the battery can be handled separate from the remainder of the cart and therefore the entire cart will not be as heavy, nor will the danger of tipping the battery be as great as it would otherwise be.

FIG. 1 shows that the body 10 has a cover plate 38 which is readily removable from the body top 39 so that the battery 28 can be lifted from the cart as mentioned. It will of course also be noticed and understood that the body 10 includes the sides 41 and 42, and the entire body therefore extends over and encloses the frame 13 and the power plant described since the body top 39 extends generally along the frame top portion 14 at the approximate elevation of the latter.

It will also be noted that the frame 13 has a rear crosspiece 43 and a front crosspiece 44, with the latter being pivotal about its axis and including an upright shaft 46 as shown in FIG. 3. The drawings further show that the handle 12 is of a tubular member which telescopes over the frame shaft 46 to be releasably connected thereto by means of the latch 47. Thus the latter is shown attached to the shaft 46 by means of pins 48, and the latch 47 is of course of a spring material and it carries the pin 49 which extends into a groove 51 in the shaft 46. In this manner, the handle 12 is releasably connected to the frame 13 by means of the latch 47. Of course the handle extends beyond the body 10 so that it can have its upper grip portion 52 disposed at a convenient level for an operator to hold the grip 52 and depress the handle, or pivot the handle about the axis of the frame crosspiece 44 so that the cart will be operated to move in the direction of the handle 12.

Of further interest in the operation of the cart, it will be noted and understood that a connecting piece 53 extends between the rotatable or pivotal cross frame member 44 and the relay 33 by means of a link 54, and thus when the handle 12 is depressed or pivoted to rotate the member 44, the link 53 is likewise pivoted, but upwardly so that the connecting link 54 engages the relay 33 and thereby closes a circuit between the battery 27 and the motor 23 to drive the wheels 18 as mentioned.

A return spring 56 is disposed between the frame 13 and the cross member 44 to urge the handle into the upwardly pivoted position so that the cart will of course not operate until the operator depresses the handle as described.

The particular manner of providing the power plant and the operation of the cart is not the concern of this invention and therefore need not be further described, but is merely referred to for a most complete description of the invention.

It is also significant that the handle 12 extends a substantial distance above the body 10, and the rack 11 also extends thereabove as shown. Both the rack 11 and the handle 12 are disconnectable. The rack 11 is mounted on the frame 13 by means of the saddle members 61 which are shown in FIG. 4 to be attached to the frame upper piece 14 through the stud 62, which is of course suitably connected to the member 61. Thus the members 61 present saddles or upwardly disposed surfaces 63 which receive a cross member 64 of the bag rack 11. Thus the member 64 is nested and secured in the members 61 in the downward direction and also in the fore-and-aft direction so that the rack 11 can rest down on the members 61. The rack also includes the side pieces 66 and the top cross piece 67 and the bottom cross piece 68. Braces 69 are connected to another cross piece 71 extending between the rack side pieces 66, and the connection may be by means of welding designated 72. The braces extend over the frame cross piece 43 by means of a lower opening 73 which is open downwardly on the braces 69. Thus the brace openings 73 nest over the frame cross piece 43 to upwardly support the rack 11 on the frame 13. To secure the rack 11 in the position described, a latch 74 is pivotally mounted on the brace 69 by the pivot pin 76, and the latch extends below the frame cross piece 43 and carries a projection 75 which fits into a detent 77 on the brace 69. This arrangement releasably secured the latch in the shown position with respect to the brace 69 so that the brace 69 cannot be removed from the frame piece 43 without pivoting the latch 74 free of the piece 43 in the counter-clockwise direction in FIG. 4. A projecting piece 78 is attached to the latch 74 to facilitate pivoting of the latter for securing and releasing the brace 69 from the frame piece 43 as mentioned. Of course the provision of the detent 77 and projection 75 for securing the latch in the pivoted position shown in respect to the brace 69 is a common nature where two pieces pivotally related may be releasably maintained by a projection on one piece and an indentation on the other piece.

It will therefore be understood that the rack 11 is supported on the frame 13 in a manner that it is secure on the frame, but it may nevertheless be readily released from the frame for disassembly therefrom and handling and storage separate from the remainder of the cart. Of course in actuality, the braces 61 extend through openings in and above the body 10 so that both the rack 11 and of course the handle 12 can be removed without the removal of the body 10, and thus the showing of the cart without the body in FIG. 2 is merely for a display of the power plant and the frame and it should be understood that the body 10 is not removed in the handling and storage of the cart.

It will also be understood that with the removal of the handle 12 and the rack 11 and the battery 27, the remainder of the cart can be readily lifted and manipulated for storage. To this end it will be noted that the frame rear cross piece 43 is available for lifting the cart, and a handle 81 is attached to the front of the frame piece 14 for likewise lifting the frame at that end. Since the body 10 conforms to the shape of the frame 13 and extends only approximately as high as the frame portion 14 and rearwardly as far as the frame portion 17 and forwardly as far as the forward extent of the frame portion 14, the handle 81 projects beyond the body 10 and is accessible for gripping and the lifting of the cart mentioned, and so is the piece 43; so pieces 43 and 81 are hand-lift portions of the frame 13.

It will also be understood that the rack 11 is arranged for holding preferably two golf bags, and these bags may be attached to the rack by means of ropes or the like connected to the rack and designated 82. FIG. 2 shows in dotted lines the forward extent of the body 10 with respect to the handle 81 and the frame upper portion 14, and likewise FIG. 4 shows the body 10 with respect to the rear of the frame 13 and the rack 11.

What is claimed is:

1. A powered golf bag cart of a type separable into its component elements, comprising a frame, powered driving means and wheels supporting said driving means both mounted on said frame for mobilizing said cart, a body mounted on said frame and enclosing both said frame and said driving means and with said body having openings therein, a handle operatively interconnected to said driving means and extending therefrom a distance, connection means on said handle for releasing said handle from said driving means in the portion of said handle extending beyond said driving means, supports on said frame and including upwardly directed surfaces extending through said body openings to be exposed beyond said body, a member on said frame and exposed beyond said body, and a golf bag rack mounted on said supports to rest downwardly on said upwardly directed supports and including a latch releasably attached to said member and with the latter attached to said frame and extending a distance from said body and being separable from said frame.

2. A golf bag cart comprising a frame, wheels attached to said frame for mobilizing said frame, a body mounted on said frame and extending completely thereover in a top portion and a depending portion terminating in a lower edge, said top portion extending horizontally to horizontal limits and said top portion having openings therein, a handle connected to said frame and extending through one of said openings and being separable in its length at a location adjacent said one of said openings, said frame including support means projecting through the other of said body openings and exposed clear of said body and with said frame including a member disposed on a level below and exposed clear of said body at said lower edge and laterally beyond the vertical plane of projection of said horizontal limits of said top portion, and a golf bag rack releasably attached to both said support means and said member and extending exteriorly of said body and a distance therefrom and at an angle to extend through the vertical plane of projection of said horizontal limits of said top portion for holding a golf bag, and with said rack being removable from the remainder of said cart.

References Cited in the file of this patent

UNITED STATES PATENTS

| 2,493,230 | Dilley | Jan. 3, 1950 |
| 2,511,990 | Nemec | June 20, 1950 |
| 2,903,082 | Marcus | Sept. 8, 1959 |
| 2,919,758 | Newton et al. | Jan. 5, 1960 |
| 2,962,106 | Burnside et al. | Nov. 29, 1960 |
| 2,973,048 | Jensen | Feb. 28, 1961 |
| 2,979,137 | Hess | Apr. 11, 1961 |
| 3,059,713 | Beggs | Oct. 23, 1962 |

FOREIGN PATENTS

| 981,873 | France | Jan. 17, 1951 |